United States Patent
Tamir et al.

(10) Patent No.: US 10,516,688 B2
(45) Date of Patent: Dec. 24, 2019

(54) RANSOMWARE RESILIENT CLOUD SERVICES

(71) Applicant: Microsoft Technology Licensing, LLC, Redmond, WA (US)

(72) Inventors: Gal Tamir, St. Avichayil (IL); Elad Iwanir, Metar (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/830,692

(22) Filed: Dec. 4, 2017

(65) Prior Publication Data

US 2018/0212987 A1      Jul. 26, 2018

Related U.S. Application Data

(60) Provisional application No. 62/449,387, filed on Jan. 23, 2017.

(51) Int. Cl.
*G06F 11/14* (2006.01)
*H04L 29/06* (2006.01)
(Continued)

(52) U.S. Cl.
CPC ...... *H04L 63/1425* (2013.01); *G06F 11/1448* (2013.01); *G06F 11/1461* (2013.01);
(Continued)

(58) Field of Classification Search
CPC .... G06F 21/566; G06F 21/568; G06F 21/552; G06F 15/18; G06F 21/562; G06F 11/1448
See application file for complete search history.

(56) References Cited

U.S. PATENT DOCUMENTS 9,317,686 B1    4/2016    Ye et al.
9,514,309 B1   12/2016    Mann
(Continued)

FOREIGN PATENT DOCUMENTS

EP    2570955 A1    3/2013
EP    3038003 A1    6/2016
(Continued)

OTHER PUBLICATIONS

Hsu, C. W., Chang, C. C., and Lin, C. J., "A Practical Guide to Support Vector Classification," Technical Report, Dept. of Computer Science and Information Engineering, National Taiwan University, Taipei, 2003, 16 pages.
(Continued)

*Primary Examiner* — Paul E Callahan
(74) *Attorney, Agent, or Firm* — Workman Nydegger

(57) ABSTRACT

An anti-ransomware system protects data in cloud storage of a cloud services provider against a ransomware attack. A backup handler is configured to at least one of: selectively retrieve backup data generated by the cloud services provider from the cloud storage; and selectively generate backup data based on the data in the cloud storage and output the backup data to a storage device. A ransomware detector is configured to detect data changes to the data resulting from a ransomware attack. A ransomware remediator communicates with the ransomware detector and the backup handler and is configured to restore the data to a state prior to the ransomware attack based upon the backup data.

22 Claims, 8 Drawing Sheets

(51) Int. Cl.
*G06F 21/56* (2013.01)
*G06F 11/30* (2006.01)

(52) U.S. Cl.
CPC ...... *G06F 11/1464* (2013.01); *G06F 11/3065* (2013.01); *G06F 21/568* (2013.01); *H04L 63/1408* (2013.01); *G06F 11/1469* (2013.01); *G06F 2201/805* (2013.01); *H04L 63/1441* (2013.01)

(56) References Cited

U.S. PATENT DOCUMENTS

| | | | |
|---|---|---|---|
| 9,535,932 | B1 | 1/2017 | DeSantis et al. |
| 10,055,582 | B1* | 8/2018 | Weaver ................ G06F 21/552 |
| 2008/0263669 | A1* | 10/2008 | Alme .................... G06F 21/56 726/24 |
| 2013/0067576 | A1 | 3/2013 | Niemela |
| 2013/0160124 | A1 | 6/2013 | St hlberg et al. |
| 2014/0181971 | A1 | 6/2014 | Tatarinov et al. |
| 2014/0310246 | A1* | 10/2014 | Vijayan ............... G06F 11/1469 707/679 |
| 2014/0373153 | A1 | 12/2014 | Niemela |
| 2016/0077923 | A1 | 3/2016 | Zhang et al. |
| 2016/0180087 | A1* | 6/2016 | Edwards ............... G06F 21/566 726/24 |
| 2016/0253498 | A1 | 9/2016 | Valencia et al. |
| 2016/0378988 | A1 | 12/2016 | Bhashkar et al. |
| 2017/0034189 | A1 | 2/2017 | Powell |
| 2017/0076096 | A1 | 3/2017 | Challener et al. |
| 2017/0257397 | A1* | 9/2017 | Graham ................. H04L 63/10 |
| 2018/0024893 | A1* | 1/2018 | Sella ................... G06F 11/1458 707/648 |
| 2018/0211039 | A1 | 7/2018 | Tamir et al. |
| 2018/0373874 | A1* | 12/2018 | Spernow ............... G06F 21/562 |

FOREIGN PATENT DOCUMENTS

| | | |
|---|---|---|
| EP | 3107024 A1 | 12/2016 |
| WO | 2018020362 A1 | 2/2018 |

OTHER PUBLICATIONS

Platt, J., "Sequential Minimal Optimization: A Fast Algorithm for Training Support Vector Mechanisms," 1998, http://research.microsoft.com/pubs/69644/tr-98-14.pdf, 21 pages.
"Remediation for Ransomware Attacks on Cloud Drive Folders", 28 pages.
International Search Report and Written Opinion for PCT Application No. PCT/US2018/014657 dated May 4, 2018; 12 pages.
"Protect yourself against Encryption-Based Ransomware", Retrieved From: https://www.synology.com/en-in/solution/ransomware, Retrieved on: Jun. 6, 2019, 7 Pages.
"The End of Ransomware", Retrieved From: http://web.archive.org/web/20170104023228/https://www.sophos.com/en-us/Ip/ransomware.aspx, Retrieved on: Jan. 4, 2017, 5 Pages.
Rosenquist, et al., "Cerber Ransomware Now Hunts for Databases", Retrieved From: https://securingtomorrow.mcafee.com/mcafee-labs/cerber-ransomware-now-hunts-databases/, Nov. 4, 2016, 5 Pages.
"Final Office Action Issued in U.S. Appl. No. 15/491,525", dated May 16, 2019, 21 Pages.
"Non Final Office Action Issued in U.S. Appl. No. 15/491,525", dated Oct. 5, 2018, 28 Pages.
"International Search Report and Written Opinion Issued in PCT Application No. PCT/US17/067450", dated Mar. 8, 2018, 11 Pages.
"Non Final Office Action Issued in U.S. Appl. No. 15/491,525", dated Jul. 29, 2019, 16 Pages.

* cited by examiner

RANSOMWARE RESILIENT CLOUD SERVICES

CROSS-REFERENCE TO RELATED APPLICATIONS

This application claims the benefit of U.S. Provisional Application No. 62/449,387, filed Jan. 23, 2017. The entire disclosure of the application referenced above is incorporated by reference.

FIELD

The present disclosure relates to computer systems and methods for detecting and remediating data stored by a cloud service provider that is adversely affected by ransomware.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Ransomware is malware that is used to deny access to computer files or data on a computer. A ransom payment is requested in return for allowing access to the computer files or data. For example, ransomware may be used to encrypt the computer files or data. A key for decrypting the files or data is sent after the ransom payment is received. For example, ransomware may be installed on computers via Trojan horses, which are malware files that are disguised as legitimate files, data or programs. For example, ransomware can also be embedded in email attachments and pictures. In the future, ransomware may be installed by hackers in other ways. If the ransom payment is paid but the ransomware is not removed from the computer, the ransomware may repeat the process of encrypting files or data and demanding a ransom payment. For example, an email with an attachment including a malicious macro may be sent to a potential ransomware victim. When the user opens the attachment, the macro installs the ransomware on the computer.

SUMMARY

An anti-ransomware system protects data in cloud storage of a cloud services provider against a ransomware attack. A backup handler is configured to at least one of: selectively retrieve backup data generated by the cloud services provider from the cloud storage; and selectively generate backup data based on the data in the cloud storage and output the backup data to a storage device. A ransomware detector is configured to detect data changes to the data resulting from a ransomware attack. A ransomware remediator communicates with the ransomware detector and the backup handler and is configured to restore the data to a state prior to the ransomware attack based upon the backup data.

In other features, the ransomware detector includes an event data handler in communication with the cloud storage that is configured to receive change events. A rule-based detector is configured to receive an output of the event data handler and to use a plurality of rules to detect the ransomware attack and generate a ransomware alert.

In other features, the ransomware detector further includes an analytics detector configured to receive the output of the event handler, to detect the ransomware attack using at least one of deep learning analysis detection and machine learning and to generate a ransomware alert. The ransomware remediator includes an alert handler configured to receive the ransomware alert from the ransomware detector and a data changer configured to replace the data based upon the backup data in response to the ransomware alert.

In other features, the cloud storage generates the backup data. The backup handler generates the backup data. The cloud storage and the backup handler generate the backup data.

An anti-ransomware system for protecting data in cloud storage of a cloud services provider against a ransomware attack includes a processor and memory. An anti-ransomware detection and remediation application is configured to at least one of: selectively retrieve backup data generated by the cloud services provider from the cloud storage; and selectively generate backup data based on the data in the cloud storage and output the backup data to a storage device. The anti-ransomware detection and remediation application detects data changes to the data resulting from a ransomware attack. In response to the ransomware attack, the anti-ransomware detection and remediation application restores the data to a state prior to the ransomware attack based upon the backup data.

In other features, the anti-ransomware detection and remediation application is further configured to receive events for the data from the cloud storage and apply a plurality of rules to the events to detect the ransomware attack. The anti-ransomware detection and remediation application is further configured to detect the ransomware attack based on the events using at least one of deep learning analysis detection and machine learning.

In other features, the anti-ransomware detection and remediation application is further configured to receive ransomware alerts and replace data based upon the backup data in response to the ransomware alerts.

In other features, the anti-ransomware detection and remediation application is further configured to schedule backups of the data in response to at least one of an event or a predetermined backup period and to store the backup data in the storage device. The cloud storage generates the backup data.

In other features, the anti-ransomware detection and remediation application generates the backup data. The cloud storage and the anti-ransomware detection and remediation application generate the backup data.

A method for protecting data in cloud storage of a cloud services provider against a ransomware attack includes at least one of selectively retrieving backup data generated by the cloud services provider from the cloud storage; and selectively generating backup data based on the data in the cloud storage and outputting the backup data to a storage device. The method includes detecting data changes to the data resulting from a ransomware attack. In response to detecting the ransomware attack, the method includes restoring the data to a state prior to the ransomware attack based upon the backup data.

In other features, the method includes receiving events relating to changes to the data from the cloud storage. The method includes monitoring the events using a plurality of rules to detect the ransomware attack and to generate a ransomware alert.

In other features, the method includes detecting the ransomware attack and generating the ransomware alert based on the events using at least one of deep learning analysis detection and machine learning.

In other features, the cloud service provider generates the backup data.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

A ransomware detection and remediation system and method according to the present disclosure includes a ransomware detector to detect data (that are stored by a cloud service provider) that has been altered by ransomware. Once the ransomware detector detects that the data has been altered by ransomware, a ransomware remediator uses backup data to replace the ransomware-altered data.

In some examples, the cloud service provider periodically stores backups of the data based on a service agreement. In other examples, a backup handler (independent from the cloud service provider) periodically stores backups of the data. The backups can be performed by the backup handler if the cloud service provider does not have a backup service built-in or when automatic backups need to be performed at a different backup rate or under different conditions than those supported by the cloud service provider. The ransomware remediator uses backup data (made prior to a time when the ransomware altered the data stored in the cloud storage) to back up the affected data.

As can be appreciated, the ransomware detector and the ransomware remediator can be implemented in a cloud network in a variety of ways. In some examples, the data is stored in the cloud network and the ransomware detector and the remediator are stored and executed by the same computing device that is located in the cloud or on-premises. In other examples, the data is stored in the cloud network and the ransomware detector and the ransomware remediator are executed by two or more computing devices. In some examples, the data, the ransomware detector and the ransomware remediator are all implemented in the cloud network using one or more servers, virtual machines or containers. Alternately, the data is stored in the cloud network and the ransomware detector and the ransomware remediator can be implemented in an enterprise network using one or more servers, virtual machines or containers.

Figure 1A:
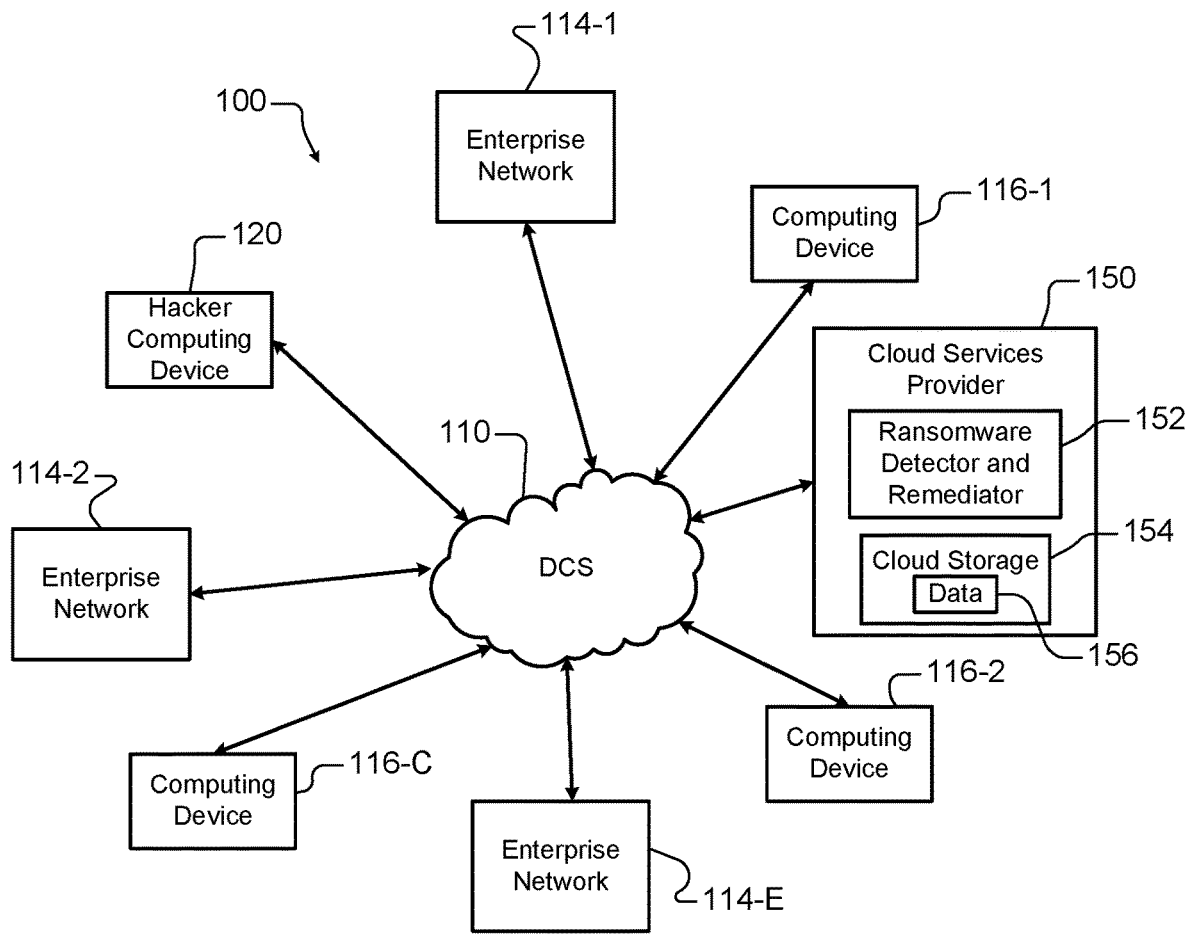
FIG. 1A is a functional block diagram of an example of a computer network including a cloud services provider providing cloud storage of data according to the present disclosure.

Referring now to FIG. 1A, one or more hacker computing devices 120 in a network 100 are connected by a distributed communication system (DCS) 110 such as the Internet to a cloud services provider 150. One or more other computing devices such as computing devices in enterprise networks 114-1, 114-2, . . . , and 114-E (collectively enterprise networks 114) (where E is an integer greater than zero) or other stand-alone computing devices 116-1, 116-2, . . . , and 116-C (collectively computing devices 116) (where C is an integer greater than zero) store data 156 in cloud storage 154 provided by the cloud services provider 150.

The hackers 120 use ransomware to alter the data 156 in cloud storage 154 provided by the cloud services provider 150. In this example, the cloud services provider 150 includes a ransomware detector and remediator 152 that detects when the data 156 have been altered by ransomware. The ransomware detector and remediator 152 uses backup data (that predates the ransomware attack) to replace the altered data and eliminate the need to pay a ransom.

Figure 1B:
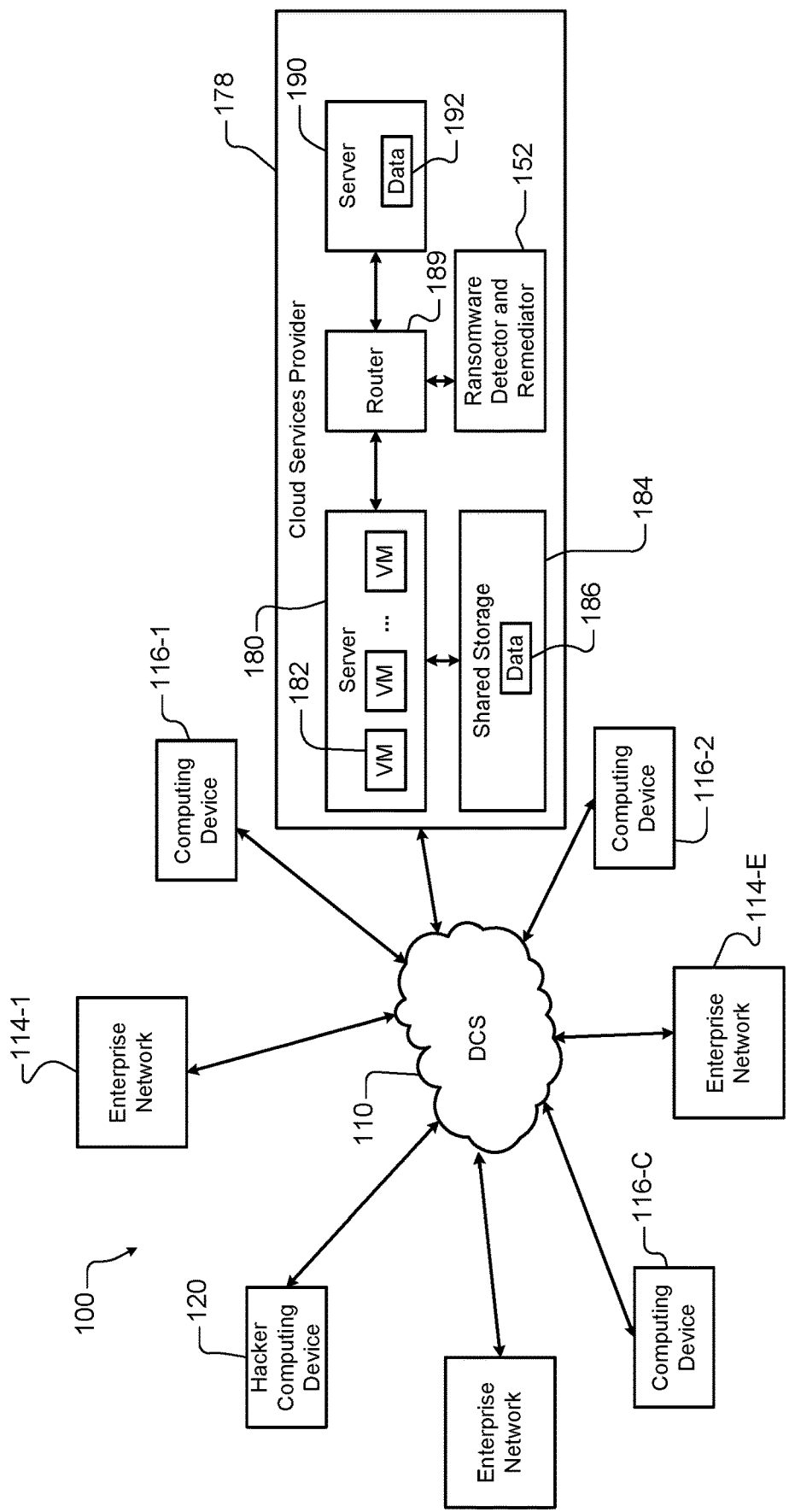
FIG. 1B is a functional block diagram of an example of a computer network including a cloud service provider supporting virtual machines or containers and storage of data according to the present disclosure.

Referring now to FIG. 1B, the hacker 120 can steal credentials to a virtual machine (VM) or container 182 of a server 180 (which runs the service) by entering a local folder and encrypting persistent data. For example, the hacker 120 may encrypt data 186 stored in shared storage of the server 180 such as a shared or virtual hard disk drive or data 192 in a server 190 connected to the server 180 by a router 189. For example, the data that is encrypted includes identifications (IDs) and the encryption may cause the service provided by the VM or container to stop working properly. The ransomware detector and remediator 152 detects when the data 186 or 192 has been altered by ransomware and remediates the data.

Figure 2A:
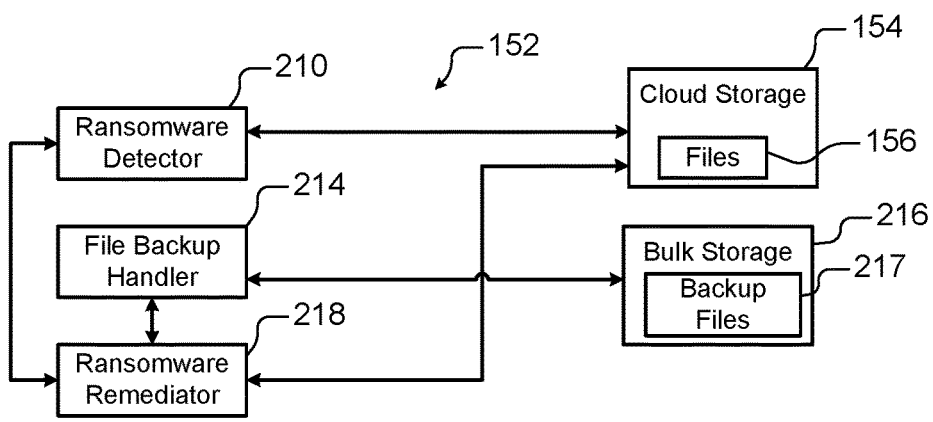
FIG. 2A is a functional block diagram of an example of a ransomware detector and remediator for data stored in cloud storage provided by a cloud services provider according to the present disclosure.

Referring now to FIG. 2A, a system for detecting and remediating ransomware is shown to include a ransomware detector 210. The ransomware detector 210 detects when data stored by the cloud services provider 150 has been altered by ransomware. In some examples, the ransomware detector 210 includes a software module or controller. A backup handler 214 selectively backs up data 217 to bulk storage 216 such as one or more hard disk drives. In some examples, the backup handler 214 includes a software module or controller. In some examples, the backup handler 214 retrieves backup data that is automatically generated by the cloud storage. In other examples, the backup handler 214 initiates backing up the data on a periodic or event basis. In still other examples, the system uses backups generated by the cloud storage and the backup handler 214.

In some examples, the ransomware detector 210 and the ransomware remediator 218 interface with a subscription handler 270 of the cloud service provider. The subscription handler 270 includes a registration handler 272, a registration table 275 and a subscriptions token table 274. Once the user selects and registers for anti-ransomware services, subscription tokens, authorization tokens and/or other tokens are issued as needed to allow access to the cloud storage and/or to continue anti-ransomware services.

Figure 2B:
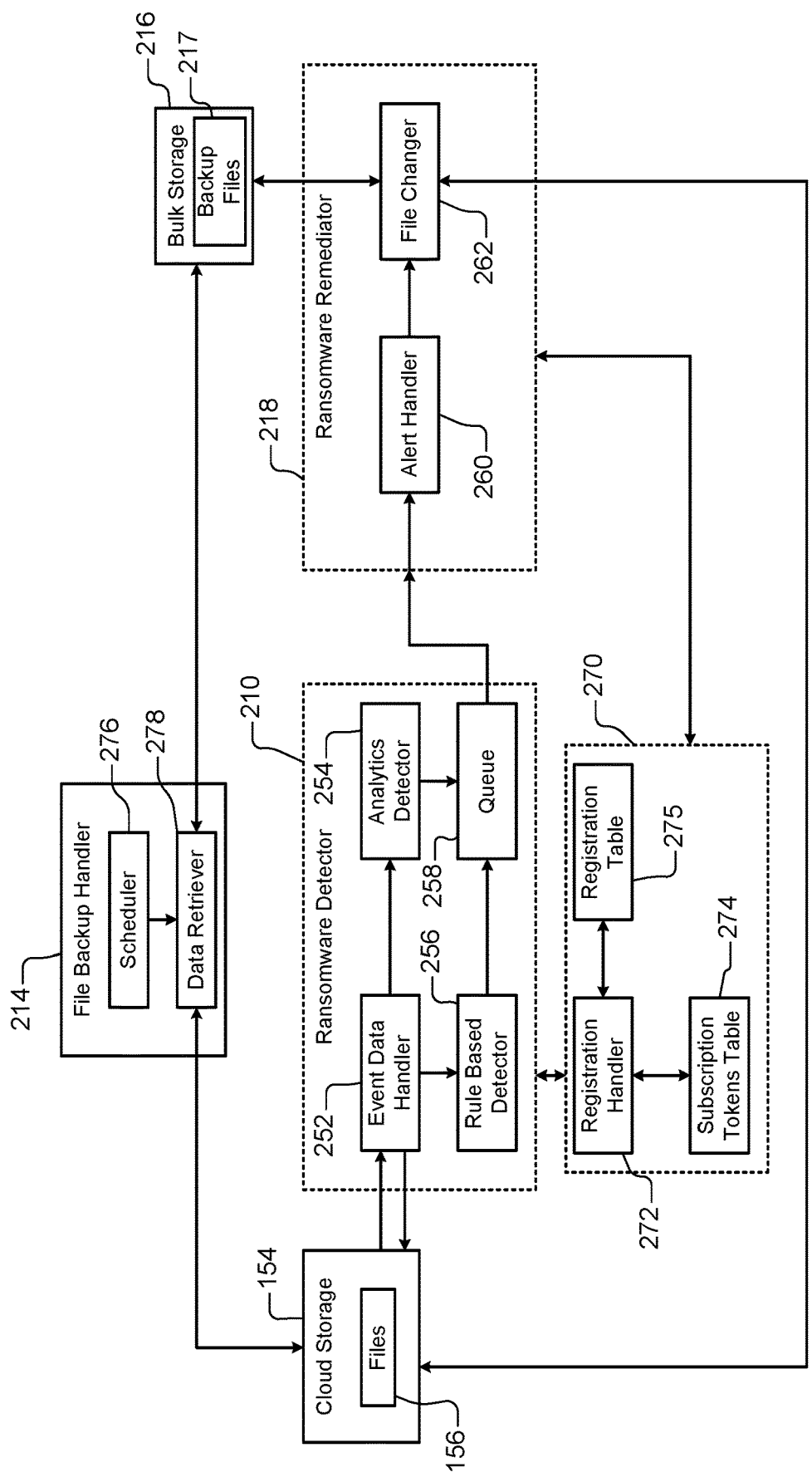
FIG. 2B is a functional block diagram of another example of a ransomware detector and remediator for the data stored in the cloud storage by the cloud services provider according to the present disclosure.

Referring now to FIG. 2B, the ransomware detector 210 may include an event data handler 252 that receives event data from the cloud storage when data changes occur. In some examples, the event data handler 252 includes an event hub. In some examples, when an event is detected, the event data handler 252 retrieves additional information about the event or file or data information. The event data handler 252 outputs the event data to an analytics detector 254 and/or a rule-based detector 256. In some examples, the analytics detector 254 uses deep analysis detection, machine learning or other techniques described below to detect ransomware attacks on the data 156. The rule-based detector 256 uses a set of rules to analyze the event data.

If a ransomware attack is detected, the analytics detector 254 and/or the rule-based detector 256 outputs a ransomware alert to a queue 258. The queue 258 outputs the ransomware alerts to an alert handler 260 associated with the ransomware remediator 218. The alert handler 260 coordinates with a file changer 262 to use the data 217 stored in the bulk storage 216 (to restore the data by restoring the data back to a point before the ransomware attack occurred). The backup handler 214 includes a backup scheduler 276 and a backup data retriever 278 to retrieve data for backup. In some examples, the backup data retriever 278 uses authorization tokens. The backup scheduler 276 may schedule backups on a periodic basis or an event basis. For example, the backup scheduler 276 may schedule backups in response to an event relating to unusual or atypical amount of changes being made to the data within a predetermined period.

In FIG. 3A, a computing device 290 such as a stand-alone computing device, or a server, virtual machine or container in an enterprise network or a cloud network is shown. The computing device 290 includes one or more processors 300 and memory 302. A host operating system 308 executes one or more user applications 312. In some examples, the computing device 290 may include an application 316 with an interface to allow the application to store data in or retrieve data from a cloud services provider. In this example, the data is altered by ransomware and needs to be remediated. The computing device 290 further includes a wired or wireless interface 334 and bulk storage 338 such as a hard disk drive.

Figure 3:
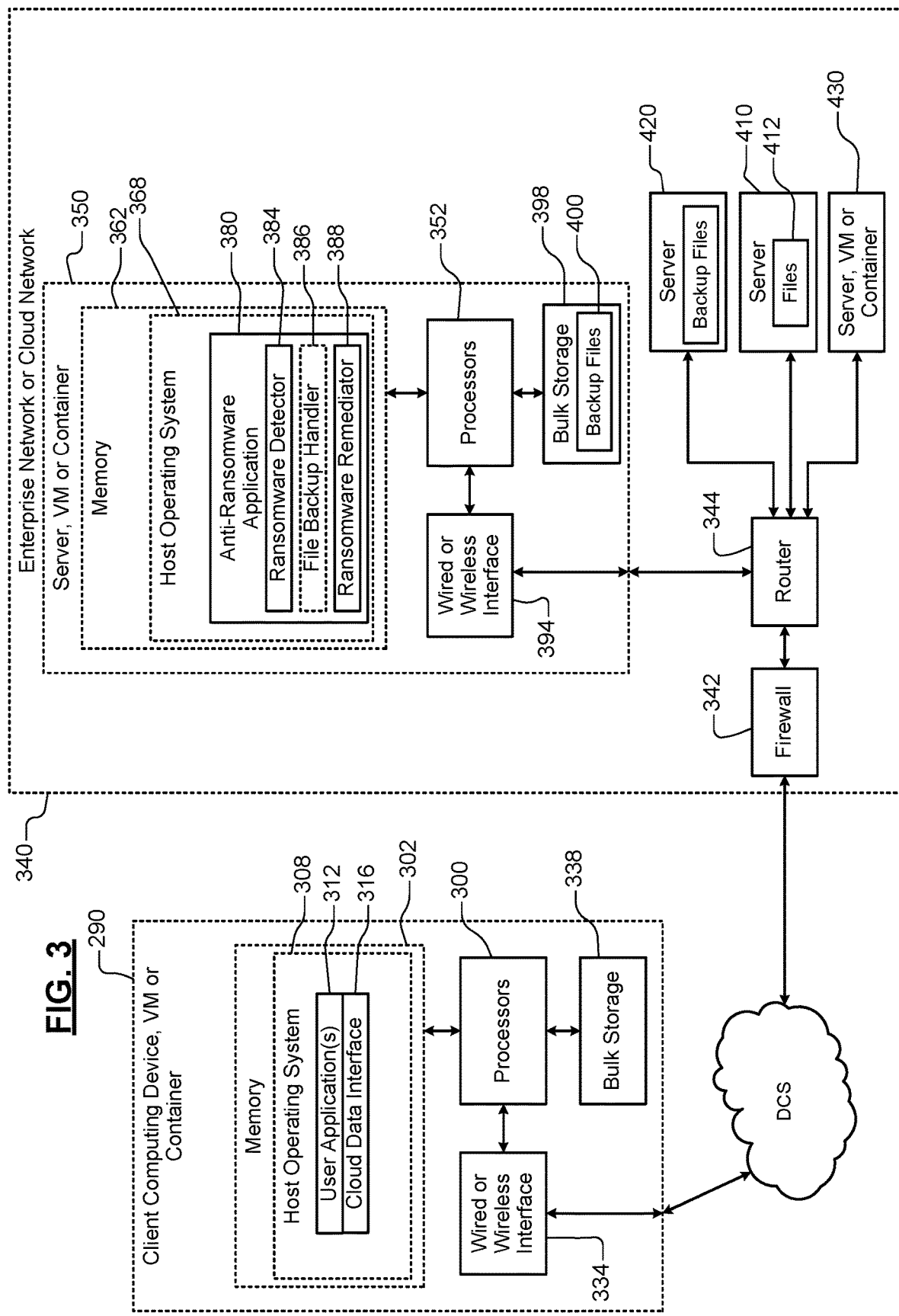
FIG. 3 is a functional block diagram of another example of a ransomware detector and remediator for the data stored in the cloud storage by the cloud services provider according to the present disclosure.

The computing device 290 communicates with a cloud network 340 (for example via the DCS, a firewall 342 and a router 344 shown in FIG. 3). A computing device 350 associated with the cloud network 340 includes one or more processors 352 and memory 362. The memory 362 includes a host operating system 368 and an anti-ransomware application 380. The anti-ransomware application 380 includes a ransomware detector 384, a backup handler 386 and a ransomware remediator 388, which can be implemented using software sub-modules. While the ransomware detector 384, the backup handler 386 and the ransomware remediator 388 are shown on a single server, virtual machine or container, separate servers, virtual machines or containers can be used. The computing device 350 further includes a wired or wireless interface 394 and bulk storage 398. In some examples, the backup data can be stored as data 400 in the bulk storage 398.

The computing device 350 communicates via the router 344 with a server 410 storing data 412 that may be affected by ransomware. The computing device 350 also communicates with one or more additional servers 420 and 430. In some examples, the servers 410 and/or 420 may be used to store the backup data.

Figure 4A:
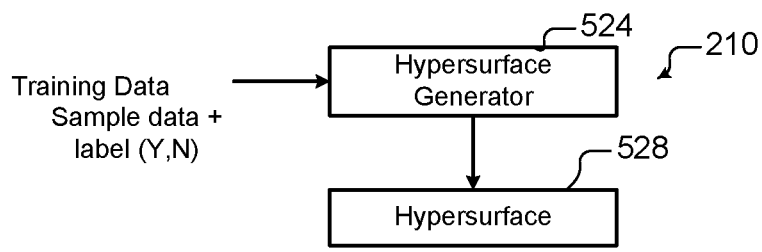
FIGS. 4A-4G are functional block diagrams illustrating additional examples of ransomware detectors for the data stored in the cloud storage by the cloud services provider according to the present disclosure.
Figure 4B:
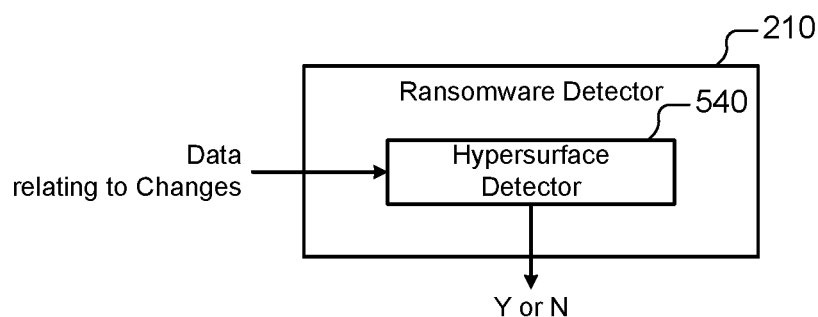

Referring now to FIGS. 4A-4G, various other examples of the ransomware detector 210 are shown. In FIG. 4A, a hypersurface generator 524 receives training data including sample data and a label identifying whether the data includes ransomware or not. As will be described further below, the hypersurface generator 524 generates a hypersurface model 528 that is used in a hypersurface detector 540 in FIG. 4B.

Figure 4C:
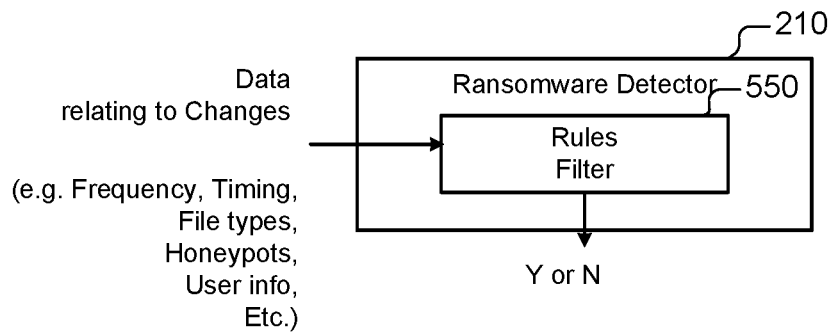

In other examples shown in FIG. 4C, the ransomware detector 210 includes a rules filter 550. The rules filter 550 includes one or more rules that are used to filter the data or event data and to identify ransomware based upon changes in frequency, timing, file types, user profiles, packet data such as source, destination, etc., file extensions, and/or information, etc. For example, the rules filter 550 may look for changes to honeypot data and/or changes to file extensions that are indicators of a ransomware attack, although other rules may be used.

Figure 4D:
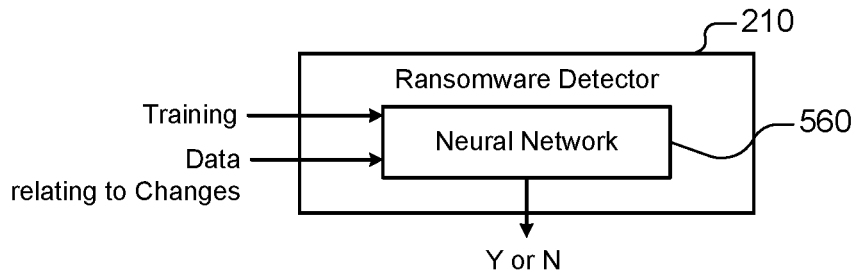

In FIG. 4D, the ransomware detector 210 includes a neural network 560 that is trained using known data. Once trained, the neural network 560 is used to identify ransomware.

Figure 4E:
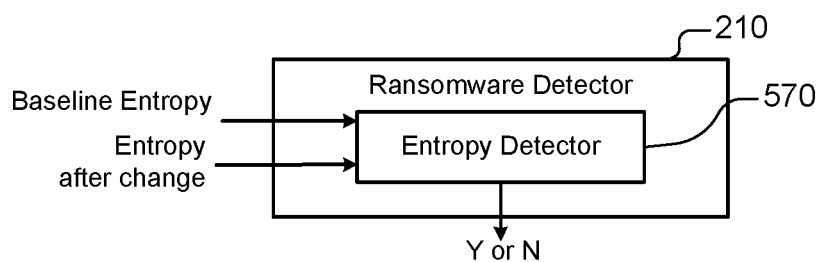

In FIG. 4E, the ransomware detector 210 includes an entropy detector 570. The entropy detector 570 measures the relative randomness of the data and assigns a randomness level on a predetermined scale. For example, data including an unencrypted list of addresses and names would be relatively non-random whereas the same data in encrypted form would be completely random. After a ransomware attack, the randomness of the data may increase as a result of encryption applied by the attacker.

Figure 4F:
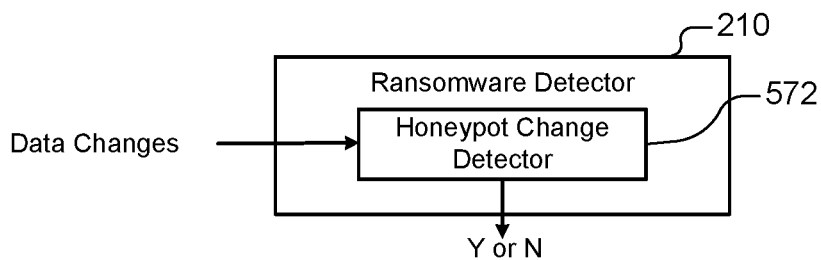

In FIG. 4F, a honeypot change detector 572 detects changes to honeypot data. As can be appreciated, while specific examples are shown, other types of ransomware detectors are contemplated. In addition, two or more of the ransomware detection techniques described above and below can be used in combination.

Figure 4G:
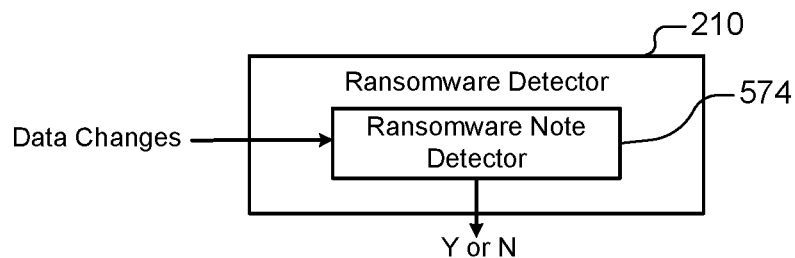

In FIG. 4G, the ransomware detector 210 includes a ransomware note detector 574 that detects a ransomware note in the changes to the data. In some examples, the ransom note may be sent by the hacker to the infected computing device. The note can be a, an email, a text file, an image file, a short messaging service (SMS), or any other form of communication. In some examples, the note is not sent to the infected device but rather is sent to another computing device such as one associated with the owner of the infected computing device. In some examples, the ransomware note detector 574 searches the data changes for keyword terms such as requests for ransom, requests for bitcoins or other currency, and/or other terms that are typically used in ransom notes. In some examples, the ransomware note detector 574 uses image recognition, optical character recognition or cognitive analysis to detect the ransom note.

In some examples, the ransomware detector 210 may use data analytics to help distinguish between legitimate changes and malicious changes. The ransomware detector 210 may use various machine-learning techniques, such as a support vector machine, a Bayesian network, learning regression, a neural network, big data analytics, an evolutionary algorithm, and so on to detect malicious changes. The ransomware detector 210 may collect various features such as the number and frequency of changes, the location of changes, the patterns of the changes (extensions, headers, entropy changes, types), user information (e.g., organization or location), and so on. After collecting the features, the ransomware detector 210 may learn a classifier on a per-user basis, a per-organization basis, or on the basis of some other division of users. For example, the ransomware detector 210 may use various clustering techniques to generate clusters of users based on various attributes of the users (e.g., business user or personal user and frequency of computer usage).

In some examples, the ransomware detector 210 may employ a support vector machine to train classifiers for each user or each division of users. To train a classifier, the training data includes samples of malicious data changes and samples of legitimate data changes where each sample comprises a feature vector of features and a label indicating whether the sample represents a malicious or legitimate change. A support vector machine operates by finding a hypersurface in the space of possible inputs. The hypersurface attempts to split the positive examples (e.g., ransomware) from the negative samples (e.g., not ransomware) by maximizing the distance between the nearest of the positive and negative samples and the hypersurface.

A support vector machine simultaneously minimizes an empirical classification error and maximizes a geometric margin. This allows for correct classification of data that is similar to but not identical to the training data. Various techniques can be used to train a support vector machine. One technique uses a sequential minimal optimization algorithm that breaks the large quadratic programming problem down into a series of small quadratic programming problems that can be solved analytically. (See Platt, J., "Sequential Minimal Optimization: A Fast Algorithm for Training Support Vector Mechanisms," 1998, http://research.microsoft.com/pubs/69644/tr-98-14.pdf, which is Incorporated herein by reference in its entirety.)

A support vector machine is provided training data represented by $(x_i, y_i)$ where $x_i$ represents a feature vector and $y_i$ represents a label for sample i. A support vector machine may be used to optimize the following:

$$\min_{w,b,T} \frac{1}{2} w^T w + C \sum_{i=1}^{l} \xi_i$$

$$\text{such that } y_i(w^T \phi(x_i) + b) \geq 1 - \xi_i, \xi_i \geq 0$$

where vector w is perpendicular to the separating hypersurface, the offset variable b is used to increase the margin, the slack variable $\xi_i$ represents the degree of misclassification of $x_i$, the function $\phi$ maps the vector $x_i$ into a higher dimensional space, and C represents a penalty parameter of the error term. A support vector machine supports linear classification but can be adapted to perform nonlinear classification by modifying the kernel function, as represented by the following:

$$(K(x_i, x_j) = \phi(x_i)^T \phi(x_j))$$

In some examples, the ransomware detector uses a radial basis function ("RBF") kernel, as represented by the following:

$$K(x_i, x_j) = \exp(-y \|x_i - x_j\|^2), y > 0$$

The ransomware detector may also use a polynomial Gaussian RBF or a sigmoid kernel. The ransomware detector may use cross-validation and grid search to find optimal values for parameters y and C. (See Hsu, C. W., Chang, C. C., and Lin, C. J., "A Practical Guide to Support Vector Classification," Technical Report, Dept. of Computer Science and Information Engineering, National Taiwan University, Taipei, 2003, which is hereby Incorporated by reference in its entirety.)

In some examples, the ransomware detector inserts honeypot data in the data. The honeypot data is used solely for the purpose of detecting malicious changes to the data 412. The cloud storage subscriber may be unaware of the presence of the honeypot data and would have no reason to change the content of the honeypot data. For example, if the ransomware detector detects any change to the honeypot data (or even a deletion of the honeypot data), the ransomware detector may assume that the change was caused by ransomware and take remedial actions such as those described above. In some examples, the honeypot data includes content that is similar to customer data to help obscure detection by ransomware.

In some examples, the ransomware detector monitors changes to the honeypot data, rather than behavior of an executing process (e.g., ransomware). The ransomware detector may factor in the entropy (e.g., Shannon entropy) of the honeypot data because data affected by ransomware may have a high entropy output (e.g., as a result of encryption). The ransomware detector may also factor in variance in the honeypot data because data affected by ransomware may have content that is completely dissimilar from its prior version. For example, the ransomware detector may employ a similarity-preserving hash function (e.g., Nilsimsa hash, TLSH, and Ssdeep) to detect changes. The ransomware detector may factor in the number of modifications to a honeypot data because data affected by ransomware may be heavily modified. For example, the ransomware detector may monitor "magic marker" type modifications, extension changes, and/or content deletions.

Figure 5:
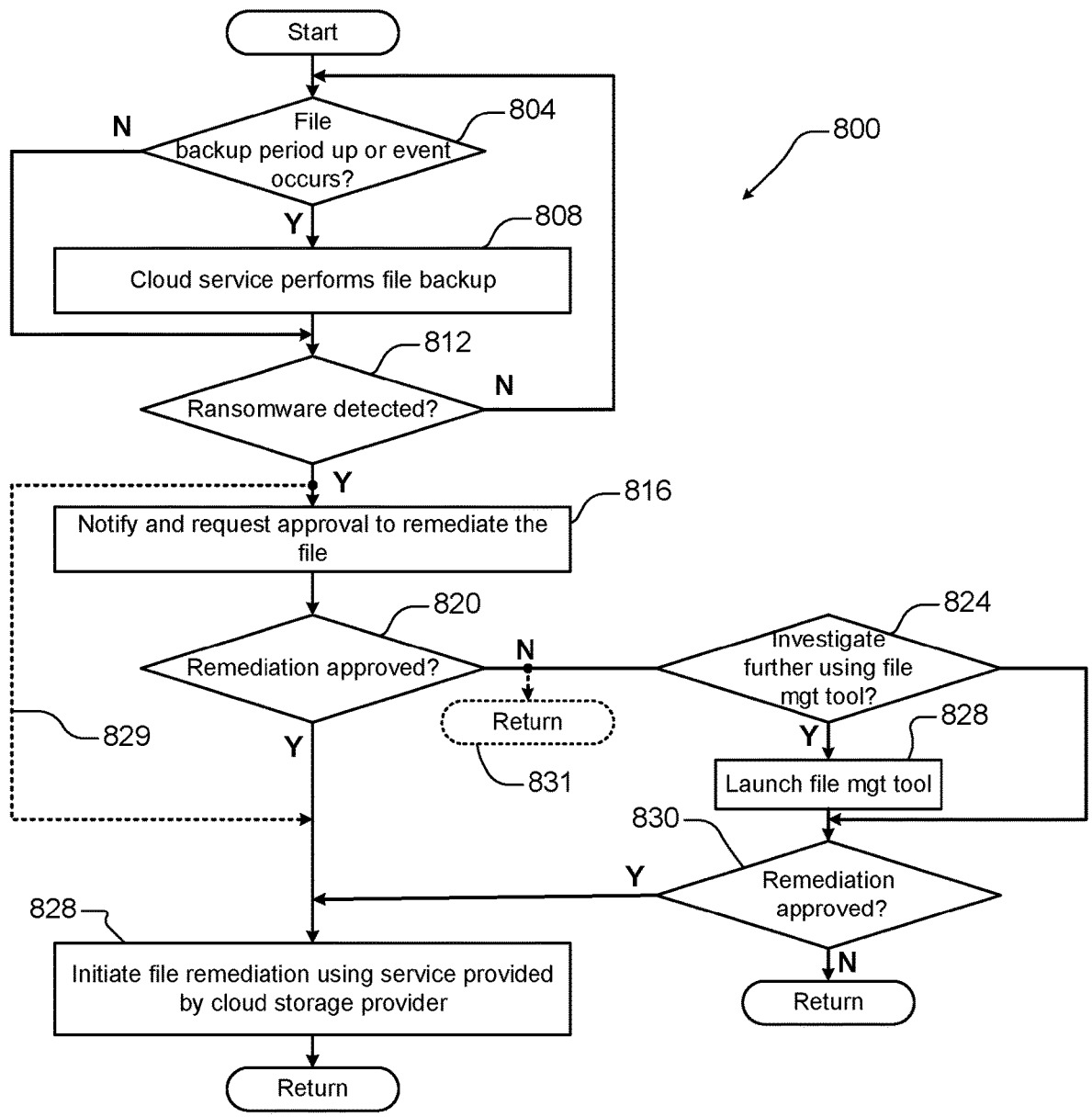
FIG. 5 is a flowchart illustrating an example of a method for ransomware detection and remediation for the data stored in the cloud storage by the cloud services provider according to the present disclosure.

Referring now to FIG. 5, a method 800 for detecting ransomware in data stored in cloud storage by a cloud services provider and remediating the data to remove the effects of the ransomware is shown. At 804, the method determines whether a backup period is up. When 804 is true, the cloud services provider performs backup at 808. At 812, the method determines whether ransomware is detected. If not, the method returns to 804. When 812 is true, the method sends a message to the cloud services provider and/or an IT administrator to notify and request approval for remediation of the data at 816. If remediation is approved at 820, the method initiates the remediation by retrieving and using backups that are earlier than the ransomware changes and overrides, deletes or renders obsolete later backups.

In some examples, the method proceeds from 812 when ransomware is detected to 828 without notifying and requesting approval for remediation as indicated at alternate path 829. If 820 is false, the method optionally returns at 831. Alternately, the method can continue from 820 to 824 where the method determines whether the administrator or other user wants to further investigate the ransomware alert using a management tool prior to initiating remediation. If 824 is true, the method continues at 828 and the management tool is launched. After the investigation, the administrator is allowed another opportunity to approve or disapprove of the remediation at 830. If 830 is true, the method continues at 828. If 830 is false, the method returns.

Figure 6:
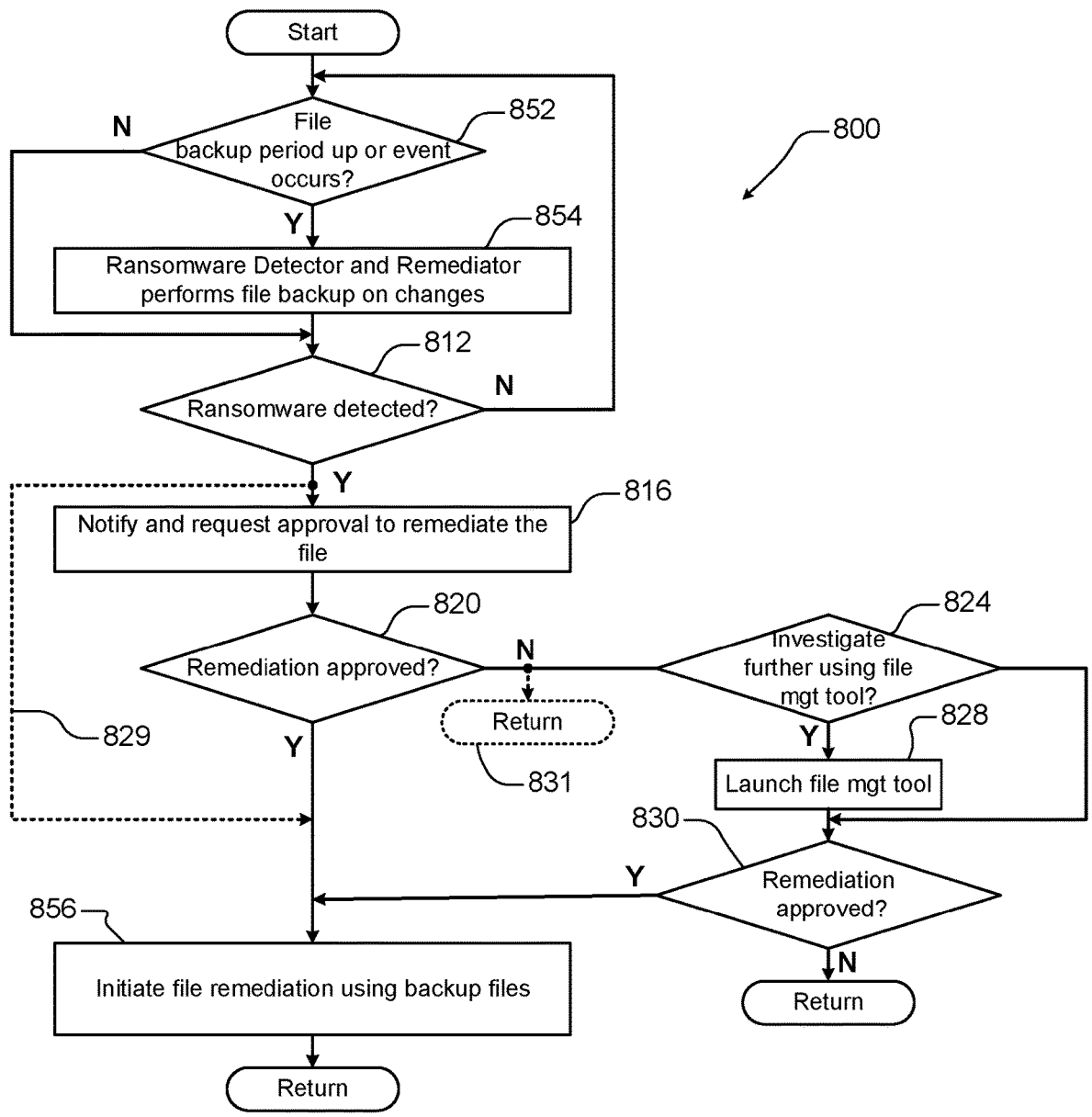
FIG. 6 is a flowchart illustrating another example of a method for ransomware detection and remediation for the data stored in the cloud storage by the cloud services provider according to the present disclosure.

Referring now to FIG. 6, a method 850 initiates the backups instead of relying on backups automatically performed by the cloud services provider. At 852, the method determines whether a backup period is up or an event occurs.

The backup may be triggered by the ransomware detector and remediator in response to one or more events such as an increase in entropy or an increase in the rate of changes within a predetermined period. In some examples, a hybrid approach is performed where some or all of the periodic backups are performed automatically by the cloud services provider. The ransomware detector and remediator may initiate periodic backups or backups in response to events.

When 852 is true, the ransomware detector and remediator and/or the cloud services provider performs backup at 854 depending on the circumstances. At 812, the method determines whether ransomware is detected. If not, the method returns to 804. When 812 is true, the method sends a message to the cloud services provider and/or an IT administrator to notify and request approval for remediation of the data at 816. If remediation is approved at 820, the method initiates the remediation using backups that are earlier than the ransomware changes and overrides, deletes or renders obsolete later backups at 856.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the examples is described above as having certain features, any one or more of those features described with respect to any example of the disclosure can be implemented in and/or combined with features of any of the other examples, even if that combination is not explicitly described. In other words, the described examples are not mutually exclusive, and permutations of one or more examples with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as JavaScript Object Notation (JSON), hypertext markup language (HTML) or extensible markup language (XML), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An anti-ransomware system for protecting data in cloud storage of a cloud services provider against a ransomware attack, the anti-ransomware system comprising:
   one or more processor(s); and
   one or more computer-readable hardware storage device(s) having stored thereon computer-executable instructions that are executable by the one or more processor(s) to cause the anti-ransomware system to:
      selectively retrieve backup data generated by the cloud services provider from the cloud storage, or, alternatively, selectively generate backup data based on the data in the cloud storage and output the backup data to a storage device;
      detect data changes to the data resulting from a ransomware attack;
      detect the ransomware attack using at least one of deep learning analysis detection or machine learning, wherein, in one or more instance(s), the ransomware attack is further detected by monitoring one or more change(s) made to honeypot data included in the data, which is stored in the cloud storage;
      generate a ransomware alert in response to detecting the ransomware attack;
      output the ransomware alert to a queue, wherein, after the queue outputs the ransomware alert, a coordination event occurs to determine how the backup data is to be used in restoring the data, which is subject to the ransomware attack; and
      after the queue outputs the ransomware alert, restore the data to a state prior to the ransomware attack based upon the backup data.

2. The system of claim 1, wherein execution of the computer-executable instructions further causes the system to:
   receive change events;
   use a plurality of rules to detect the ransomware attack.

3. The system of claim 1, wherein execution of the computer-executable instructions further causes the system to:
   replace the data based upon the backup data in response to the ransomware alert.

4. The system of claim 1, wherein the cloud storage generates the backup data.

5. The system of claim 1, wherein detecting the data changes to the data resulting from the ransomware attack is performed using one or more rule(s) used to filter the data in the database.

6. The system of claim 1, wherein the cloud storage generates the backup data, and wherein detecting the data changes to the data resulting from the ransomware attack is performed using one or more rule(s) used to filter the data in the database.

7. The system of claim 1, wherein detecting the ransomware attack is performed using the machine learning,
   wherein the machine learning uses a support vector machine to distinguish between legitimate changes to the data and malicious changes to the data, and
   wherein the support vector machine is configured to support linear classification and nonlinear classification, the nonlinear classification being supported as a result of modifying a kernel function of the system.

8. The system of claim 1, wherein the system is further configured to use one or more of the following to detect the ransomware attack: a radial basis function (RBF) kernel, a polynomial gaussian RBF kernel, or a sigmoid kernel.

9. An anti-ransomware system for protecting data in cloud storage of a cloud services provider against a ransomware attack, the anti-ransomware system comprising:
   a processor;
   memory; and
   an anti-ransomware detection and remediation application that is instantiated in the memory and that is executed by the processor, the anti-ransomware detection and remediation application being configured to:
      selectively retrieve backup data generated by the cloud services provider from the cloud storage, or, alternatively, selectively generate backup data based on the data in the cloud storage and output the backup data to a storage device;
      detect data changes to the data resulting from a ransomware attack;
      detect the ransomware attack using at least one of deep learning analysis detection or machine learning, wherein, in one or more instance(s), the ransomware attack is further detected by monitoring one or more change(s) made to honeypot data included in the data, which is stored in the cloud storage;
      generate a ransomware alert in response to detecting the ransomware attack;
      output the ransomware alert to a queue, wherein, after the queue outputs the ransomware alert, a coordination event occurs to determine how the backup data is to be used in restoring the data, which is subject to the ransomware attack; and after the queue outputs the ransomware alert and in response to the ransomware attack, restore the data to a state prior to the ransomware attack based upon the backup data.

10. The system of claim 9, wherein the anti-ransomware detection and remediation application is further configured to:

receive events for the data from the cloud storage; and apply a plurality of rules to the events to detect the ransomware attack.

11. The system of claim 10, wherein the anti-ransomware detection and remediation application is further configured to detect the ransomware attack based on the events using at least one of the deep learning analysis detection or the machine learning.

12. The system of claim 9, wherein the anti-ransomware detection and remediation application is further configured to:

receive ransomware alerts; and replace data based upon the backup data in response to the ransomware alerts.

13. The system of claim 9, wherein the anti-ransomware detection and remediation application is further configured to schedule backups of the data in response to at least one of an event or a predetermined backup period and to store the backup data in the storage device.

14. The system of claim 9, wherein the cloud storage generates the backup data.

15. The system of claim 9, wherein the anti-ransomware detection and remediation application generates the backup data.

16. The system of claim 9, wherein the cloud storage and the anti-ransomware detection and remediation application generate the backup data.

17. The system of claim 9, wherein the anti-ransomware detection and remediation application is further configured to detect a ransomware note in the data changes.

18. A method for protecting data in cloud storage of a cloud services provider against a ransomware attack, the method comprising:

selectively retrieving backup data generated by the cloud services provider from the cloud storage, or, alternatively, selectively generating backup data based on the data in the cloud storage and outputting the backup data to a storage device;

detecting data changes to the data resulting from a ransomware attack;

detecting the ransomware attack using at least one of deep learning analysis detection or machine learning, wherein, in one or more instance(s), the ransomware attack is further detected by monitoring one or more change(s) made to honeypot data included in the data which is stored in the cloud storage;

generating a ransomware alert in response to detecting the ransomware attack;

outputting the ransomware alert to a queue, wherein, after the queue outputs the ransomware alert, a coordination event occurs to determine how the backup data is to be used in restoring the data, which is subject to the ransomware attack; and after the queue outputs the ransomware alert and in response to detecting the ransomware attack, restoring the data to a state prior to the ransomware attack based upon the backup data.

19. The method of claim 18, further comprising receiving events relating to changes to the data from the cloud storage.

20. The method of claim 19, further comprising monitoring the events using a plurality of rules to detect the ransomware attack and to generate the ransomware alert.

21. The method of claim 19, further comprising detecting the ransomware attack and generating the ransomware alert based on the events using at least one of the deep learning analysis detection or the machine learning.

22. The method of claim 18, wherein the cloud service provider generates the backup data.

* * * * *